Patented July 3, 1945

2,379,767

UNITED STATES PATENT OFFICE 2,379,767

BRAKE FOR HEAVY VEHICLES

Irving R. Valentine, Erie, Pa., assignor to General Electric Company, a corporation of New York No Drawing. Application July 22, 1942, Serial No. 451,957

2 Claims. (Cl. 188—78)

The present invention is a brake or clutch particularly adapted for use in connection with heavy vehicles such as tanks or like military equipment. In the construction of tanks, steering, in many cases, is effected through planetary gearing, the rotation of the various gears being controlled by means of brake bands or plates in order to effect desired changes in direction of the vehicle travel. In accomplishing this result, there is an almost continuous use of the brake which operates in oil and at high temperatures. Fabric or like brake bands commonly employed in connection with automobiles are not adapted for such heavy duty and wear out very quickly, for example within a few hours when employed to control the steering of heavy tanks.

It is one of the objects of the present invention to provide a brake or clutch which is capable of efficient operation in oil and under high temperature conditions and which has a long life even when operated under adverse conditions such as encountered in tank operation.

In carrying out my invention, I employ as the brake or clutch, cooperating metal members both or either one of which may be forged, rolled or cast, preferably however, both members consist of rolled materials. One of the members of the brake or clutch is a ferrous material containing silicon, for example S. A. E. 9255 steel containing:

| | Per cent |
|---|---|
| Carbon | .40 to .50 |
| Manganese | .60 to .90 |
| Silicon | 1.80 to 2.20 |
| Iron | Remainder |

The other member of the brake or clutch is a high speed steel having red hardness properties and consisting of:

| | Per cent |
|---|---|
| Carbon | .50 to .60 |
| Manganese | .20 to .40 |
| Chromium | 3.50 to 4.50 |
| Molybdenum | 7.50 to 8.50 |
| Tungsten | 1.25 to 2.00 |
| Vanadium | .90 to 1.25 |
| Silicon | .25 to .30 |
| Iron | Remainder |

The greater part of the friction developed in the brake or clutch is due to the presence of silicon in the members. While for this purpose a high silicon content might appear desirable, it should not be high enough to cause brittleness in the brake members. Cast material obviously may have a higher silicon content than forged material but the forged or rolled material is more satisfactory. A certain amount of carbon is desirable in the brake members to provide residual hardness or a desired hardness after heat treatment.

Cooperating brake members having the composition hereinbefore set forth are capable of withstanding high pressures such as encountered in railway equipment, for example pressures of 200 to 500 pounds per square inch, whereas non-ferrous brake material will show excessive wear while developing friction at such pressures.

The present brake or clutch may be operated equally well in oil or dry. It will stand heavy loads and will operate at temperatures up to a dull red heat, for example about 500 to 600° C.

What I claim as new and desire to secure by Letters Patent of the United States, is:

1. In a device of the class described cooperating members which are placed in friction gripping engagement with one another, one of said members being S. A. E. 9255 steel and the other a high speed steel containing about 3.50 to 4.50% chromium, about 7.50 to 8.50% molybdenum, 1.25 to 2.00% tungsten and about .90 to 1.25% vanadium with the remainder substantially all iron.

2. In a device of the class described cooperating steel members adapted to be placed in frictional engagement with one another one of said members consisting of about

| | Per cent |
|---|---|
| Carbon | .40 to .50 |
| Manganese | .60 to .90 |
| Silicon | 1.80 to 2.20 |
| Iron | Remainder | the other member containing

| | Per cent |
|---|---|
| Carbon | .50 to .60 |
| Manganese | .20 to .40 |
| Chromium | 3.50 to 4.50 |
| Molybdenum | 7.50 to 8.50 |
| Tungsten | 1.25 to 2.00 |
| Vanadium | .90 to 1.25 |
| Silicon | .25 to .30 |
| Iron | Remainder |

IRVING R. VALENTINE.